(12) United States Patent
Hao et al.

(10) Patent No.: US 12,634,871 B2
(45) Date of Patent: May 19, 2026

(54) POSITIONING MEASUREMENT METHOD AND APPARATUS

(71) Applicant: HUAWEI TECHNOLOGIES CO., LTD., Shenzhen (CN)

(72) Inventors: Jinping Hao, Shanghai (CN); Yinghao Jin, Boulogne Billancourt (FR); Yinghao Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 18/359,627

(22) Filed: Jul. 26, 2023

(65) Prior Publication Data

US 2023/0370995 A1 Nov. 16, 2023

Related U.S. Application Data

(63) Continuation of application No. PCT/CN2021/073803, filed on Jan. 26, 2021.

(51) Int. Cl.
*H04W 64/00* (2009.01)

(52) U.S. Cl.
CPC .................................. *H04W 64/00* (2013.01)

(58) Field of Classification Search
None
See application file for complete search history.

(56) References Cited

U.S. PATENT DOCUMENTS

| | | | |
|---|---|---|---|
| 2020/0045690 A1 | 2/2020 | Martin et al. | |
| 2022/0360378 A1* | 11/2022 | Zarifi | .................... H04L 27/261 |
| 2023/0345410 A1* | 10/2023 | Kim | ...................... H04W 64/00 |

FOREIGN PATENT DOCUMENTS

| | | |
|---|---|---|
| CN | 110475200 A | 11/2019 |
| WO | 2020168573 A1 | 8/2020 |

* cited by examiner

*Primary Examiner* — Idowu O Osifade

(74) *Attorney, Agent, or Firm* — Leydig, Voit & Mayer, Ltd.

(57) ABSTRACT

A positioning measurement method and an apparatus are provided. The method includes: after a first network element receives, from a second network element, an indication of obtaining location information of a terminal, the first network element requests at least one access network device to broadcast a message. The terminal starts to send a reference signal upon receiving the message broadcast. The first network element further requests the at least one access network device to measure the reference signal. Upon receiving a measurement request, the access network device measures the received reference signal, to obtain a corresponding measurement result; then sends the measurement result to the first network element. According to the present application, during uplink positioning, a terminal in a non-connected state does not need to re-enter a connected state, thereby reducing a delay for positioning the terminal, reducing energy consumption of the terminal, and improving positioning efficiency.

20 Claims, 9 Drawing Sheets

POSITIONING MEASUREMENT METHOD AND APPARATUS

CROSS-REFERENCE TO RELATED APPLICATIONS

This application is a continuation of International Application No. PCT/CN2021/073803, filed on Jan. 26, 2021, the disclosure of which is hereby incorporated by reference in its entirety.

TECHNICAL FIELD

Embodiments of this application relate to the communication field, and in particular, to a positioning measurement method and an apparatus.

BACKGROUND

Positioning is one of important functions in a fifth generation (5G) mobile communication system. Currently, there are a plurality of positioning technologies for locating a terminal, including technologies such as uplink-related positioning technologies: an uplink time difference of arrival (UL-TDOA) technology, an uplink angle-of-arrival (UL-AOA) technology. In the two positioning technologies, the UL-TDOA technology is a technology in which base stations determine a location of a terminal by measuring a time difference of arrival of sounding reference signals (SRS) from the terminal to the plurality of base stations, and the UL-AOA technology is a technology in which base stations determine a location of a terminal by measuring angles of arrival at which SRSs from the terminal arrive at the plurality of base stations.

In both of the two positioning technologies, a serving base station connected to the terminal needs to configure an SRS resource for the terminal, so that the terminal sends an SRS based on the configured SRS resource. Therefore, the terminal and the base station need to be in a connected state. When the terminal is in a non-connected state, the terminal needs to first enter the connected state before being located. This process is complex and time-consuming, resulting low efficiency for locating the terminal in the non-connected state.

SUMMARY

Embodiments of this application provide a positioning measurement method and an apparatus, to resolve problems of a long delay and high energy consumption caused, as a terminal needs to first enter a connected state before being located, in a case that the terminal is in a non-connected state.

To achieve the foregoing purpose, the following technical solutions are used in embodiments of this application.

According to a first aspect, an embodiment of this application provides a positioning measurement method. The method may include: A first network element (such as a location management function network element) receives a first message from a second network element (such as an access management function network element), where the first message indicates the first network element to obtain location information of a terminal. The first network element sends a broadcast request and a measurement request to at least one access network device, where the broadcast request indicates to broadcast a second message, the measurement request indicates to measure a reference signal, the second message indicates the terminal to send the reference signal, and the at least one access network device includes an access network device that the terminal camps on.

According to the method in the first aspect, the terminal in a non-connected state may send the reference signal, for example, an SRS by receiving the broadcast message from the access network device, without re-entering a connected state, and the access network device subsequently measures the reference signal. The first network element may determine the location information of the terminal based on a measurement result obtained by the access network device. In this way, during uplink positioning, the terminal in the non-connected state does not need to re-enter a connected state. Therefore, a delay in terminal positioning is reduced, energy consumption of the terminal is reduced, and positioning efficiency is improved.

In a possible implementation, that the first network element sends a broadcast request and a measurement request to at least one access network device includes: The first network element sends a third message to the at least one access network device, where the third message includes the broadcast request and the measurement request.

Based on this possible implementation, the first network element sends the broadcast request and the measurement request via one message, so that resources can be saved and system efficiency can be improved.

In another possible implementation, the measurement request includes a measurement item, and the measurement item indicates a target parameter for measuring the reference signal.

Based on this possible implementation, the access network device may determine, based on the measurement item, parameters of the reference signal that need to be measured.

In another possible implementation, the first message includes an identifier of the access network device that the terminal camps on and/or an identifier of a cell in which the access network device that the terminal camps on is located.

Based on this possible implementation, the second network element may indicate, to the first network element via the first message, the access network device that the terminal in the non-connected state camps on or the cell in which the access network device that the terminal camps on is located, so that the first network element sends the broadcast request and the measurement request to the related access network device. This avoids a case in which the terminal cannot receive the broadcast message sent by the access network device because the first network element sends the foregoing requests to the access network device that is far away from the terminal.

In another possible implementation, the method further includes: The first network element receives the measurement result from the at least one access network device, and the first network element determines the location information of the terminal based on the measurement result.

Based on this possible implementation, the first network element receives the measurement result sent by the at least one access network device, and may determine the location information of the terminal based on the received measurement result. The result of the obtained location information of the terminal is accurate. For example, the first network element may obtain the location information of the terminal based on the measurement result by using an uplink positioning technology such as an uplink time difference of arrival technology or an uplink angle-of-arrival technology.

In another possible implementation, the method further includes: The first network element receives an identifier of the terminal from the access network device that the terminal camps on, where the identifier of the terminal is from the terminal.

Based on this possible implementation, the first network element may associate the obtained measurement result with the corresponding terminal based on the identifier of the terminal, thereby improving accuracy of obtaining the location information of the corresponding terminal by the first network element based on the measurement result.

In another possible implementation, the measurement result includes a timestamp and/or an SRS resource identifier (or an SRS identifier) of a first SRS resource that are/is used by the first network element to determine that the measurement result is obtained by measuring the terminal. The timestamp indicates time at which the at least one access network device measures the reference signal, and the first SRS resource is used by the terminal to send the reference signal.

Based on this possible implementation, the terminal may be associated with the measurement result based on the timestamp and/or the SRS resource identifier of the first SRS resource, thereby improving accuracy of obtaining the location information of the corresponding terminal by the first network element based on the measurement result.

In another possible implementation, the method further includes: The first network element receives a long term evolution positioning protocol (LPP) message of the terminal forwarded by the access network device that the terminal camps on.

Based on this possible implementation, positioning assistance information (such as battery power information of the terminal and the SRS resource identifier of the SRS resource on which the terminal sends the reference signal) may be transmitted between the first network element and the terminal via the LPP message.

According to a second aspect, an embodiment of this application provides a communication apparatus. The communication apparatus may be a first network element, or a chip or a system-on-chip in the first network element. The communication apparatus may implement the functions performed by the first network element in the first aspect or the possible implementations of the first aspect. The functions may be implemented by using hardware, or may be implemented by hardware executing corresponding software. The hardware or the software includes one or more modules corresponding to the foregoing functions. For example, the communication apparatus may include a receiving unit, a sending unit, a processing unit, and the like.

The receiving unit may be configured to receive a first message from a second network element, where the first message indicates a first network element to obtain location information of a terminal. The sending unit may be configured to send a broadcast request and a measurement request to at least one access network device, where the broadcast request indicates to broadcast a second message, the measurement request indicates to measure a reference signal, the second message indicates the terminal to send the reference signal, and the at least one access network device includes an access network device that the terminal camps on.

In a possible implementation, the sending unit is specifically configured to send a third message to the at least one access network device, where the third message includes the broadcast request and the measurement request.

In another possible implementation, the measurement request includes a measurement item, and the measurement item indicates a target parameter for measuring the reference signal.

In another possible implementation, the first message includes an identifier of the access network device that the terminal camps on and/or an identifier of a cell in which the access network device that the terminal camps on is located.

In another possible implementation, the receiving unit is further configured to receive a measurement result from the at least one access network device, and the processing unit is configured to determine the location information of the terminal based on the measurement result.

In another possible implementation, the receiving unit is further configured to receive an identifier of the terminal from the access network device that the terminal camps on, where the identifier of the terminal is from the terminal.

In another possible implementation, the measurement result includes a timestamp and/or an SRS resource identifier (or an SRS identifier) of a first SRS resource that are/is used by the first network element to determine that the measurement result is obtained by measuring the terminal. The timestamp indicates time at which the at least one access network device measures the reference signal, and the first SRS resource is used by the terminal to send the reference signal.

In another possible implementation, the receiving unit is further configured to receive a long term evolution positioning protocol (LPP) message of the terminal forwarded by the access network device that the terminal camps on.

According to a third aspect, an embodiment of this application provides a communication apparatus, including a processor and a memory. The memory is configured to store computer-executable instructions. When the communication apparatus operates, the processor executes the computer-executable instructions stored in the memory, so that the communication apparatus performs the positioning measurement method according to any one of the first aspect or the possible implementations of the first aspect.

According to a fourth aspect, an embodiment of this application provides a computer-readable storage medium. The computer-readable storage medium stores instructions. When the instructions are run on a computer, the computer performs the positioning measurement method according to any one of the first aspect or the possible implementations of the first aspect.

According to a fifth aspect, an embodiment of this application provides a computer program product including instructions. When the computer program product is run on a computer, the computer performs the positioning measurement method according to any one of the first aspect or the possible implementations of the first aspect.

According to a sixth aspect, an embodiment of this application provides a communication apparatus. The communication apparatus may be a chip system. The chip system may include a processor and a transceiver, to support the communication apparatus to implement the functions of any one of the first aspect or the possible implementations of the first aspect. In a possible design, the chip system further includes a memory. The memory is configured to store program instructions and data that are necessary for the communication apparatus. The chip system may include a chip, or may include a chip and another discrete component.

For technical effects achieved in any implementations of the second aspect to the sixth aspect, refer to the technical effects achieved in any one of the first aspect or the possible implementations of the first aspect. Details are not described again.

According to a seventh aspect, an embodiment of this application provides another positioning measurement method. The method may include: An access network device receives a broadcast request and a measurement request from a first network element, where the measurement request indicates to measure a reference signal. The access network device broadcasts a second message based on the broadcast request, where the second message indicates a terminal to send a reference signal. The access network device measures the reference signal sent by the terminal, to obtain a measurement result.

According to the method in the seventh aspect, the terminal in a non-connected state send the reference signal, for example, an SRS by receiving the broadcast message from the access network device, without re-entering a connected state, and the access network device subsequently measures the reference signal. The first network element may determine the location information of the terminal based on the measurement result obtained by the access network device. In this way, during uplink positioning, the terminal in the non-connected state does not need to re-enter a connected state. Therefore, a delay in terminal positioning is reduced, energy consumption of the terminal is reduced, and positioning efficiency is improved.

In a possible implementation, that an access network device receives a broadcast request and a measurement request from a first network element includes: The access network device receives a third message from the first network element, where the third message includes the broadcast request and the measurement request.

Based on this possible implementation, the first network element sends the broadcast request and the measurement request via one message, so that resources can be saved and system efficiency can be improved.

In another possible implementation, the measurement request includes a measurement item, and the measurement item indicates a target parameter for measuring the reference signal. That the access network device measures the reference signal sent by the terminal to obtain a measurement result includes: The access network device measures the measurement item of the reference signal, to obtain the measurement result.

Based on this possible implementation, the access network device may determine, based on the measurement item, parameters of the reference signal that need to be measured.

In another possible implementation, the second message includes configuration information of a plurality of SRS resources, and the plurality of SRS resources are used by the terminal to send the reference signal.

Based on this possible implementation, the terminal may obtain, based on the received second message, the SRS resource that may be used to send the reference signal. In this way, the terminal selects the SRS resource for sending the reference signal, and reliability of sending the reference signal by the terminal is improved.

In another possible implementation, the method further includes: The access network device searches the plurality of SRS resources, to measure the reference signal of the terminal on one of the plurality of SRS resources.

Based on this possible implementation, when the terminal selects one of the plurality of SRS resources to send the reference signal, the access network device may determine, through searching, the SRS resource used for sending the reference signal, and measure the reference signal on the SRS resource.

In another possible implementation, the method further includes: The access network device receives, from the terminal, an SRS resource identifier (or an SRS identifier) of a first SRS resource, where the first SRS resource is used by the terminal to send the reference signal. The access network device measures the reference signal of the terminal on the first SRS resource based on the SRS resource identifier of the first SRS resource.

Based on this possible implementation, the terminal may report, to the access network device, the SRS resource that is selected by the terminal for sending the reference signal, so that the access network device measures the reference signal without searching the SRS resources. In this way, efficiency of measuring the reference signal by the access network device is improved.

In another possible implementation, the method further includes: The access network device sends a measurement result to the first network element, where the measurement result includes a timestamp and/or the SRS resource identifier of the SRS resource on which the reference signal of the terminal is measured, and the timestamp indicates time at which the access network device measures the reference signal.

Based on this possible implementation, the terminal may be associated with the measurement result based on the timestamp and/or the SRS resource identifier of the first SRS resource, thereby improving accuracy of obtaining the location information of the corresponding terminal by the first network element based on the measurement result.

In another possible implementation, the access network device is an access network device that the terminal camps on, and the method further includes: The access network device receives a fourth message from the terminal, where the fourth message includes an identifier of the terminal.

Based on this possible implementation, the first network element may associate the obtained measurement result with the corresponding terminal based on the identifier of the terminal, thereby improving accuracy of obtaining, by the first network element, the location information of the corresponding terminal based on the measurement result.

In another possible implementation, the fourth message is a radio resource control (RRC) message or a media access control (MAC) message.

In another possible implementation, the fourth message further includes a long term evolution positioning protocol (LPP) message, and the method further includes: The access network device sends the LPP message to the first network element.

Based on this possible implementation, positioning assistance information (such as battery power information of the terminal and the SRS resource identifier of the SRS resource on which the terminal sends the reference signal) may be transmitted between the first network element and the terminal via the LPP message.

According to an eighth aspect, an embodiment of this application provides a communication apparatus. The communication apparatus may be an access network device, or a chip or a system-on-chip in the access network device. The communication apparatus may implement functions performed by the access network device in the seventh aspect or the possible implementations of the seventh aspect. The functions may be implemented by using hardware, or may be implemented by hardware executing corresponding software. The hardware or the software includes one or more modules corresponding to the functions. For example, the communication apparatus may include a receiving unit, a sending unit, a processing unit, and the like.

The receiving unit may be configured to receive a broadcast request and a measurement request from a first network element, where the measurement request indicates to measure a reference signal.

The sending unit may be configured to broadcast a second message based on the broadcast request, where the second message indicates a terminal to send the reference signal.

The processing unit may be configured to measure the reference signal sent by the terminal, to obtain a measurement result.

In a possible implementation, the receiving unit is specifically configured to receive a third message from the first network element, where the third message includes the broadcast request and the measurement request.

In another possible implementation, the measurement request includes a measurement item, and the measurement item indicates a target parameter for measuring the reference signal. The processing unit is specifically configured to measure the measurement item of the reference signal, to obtain the measurement result.

In another possible implementation, the second message includes configuration information of a plurality of SRS resources, and the plurality of SRS resources are used by the terminal to send the reference signal.

In another possible implementation, the processing unit is further configured to search the plurality of SRS resources, to measure the reference signal of the terminal on one of the plurality of SRS resources.

In another possible implementation, the receiving unit is further configured to receive, from the terminal, an SRS resource identifier (or an SRS identifier) of a first SRS resource, where the first SRS resource is used by the terminal to send the reference signal. The processing unit is specifically configured to measure the reference signal of the terminal on the first SRS resource based on the SRS resource identifier of the first SRS resource.

In another possible implementation, the sending unit is further configured to send a measurement result to the first network element, where the measurement result includes a timestamp and/or the SRS resource identifier of the SRS resource on which the reference signal of the terminal is measured. The timestamp indicates time at which the access network device measures the reference signal.

In another possible implementation, the access network device is an access network device that the terminal camps on, and the receiving unit is further configured to receive a fourth message from the terminal, where the fourth message includes an identifier of the terminal.

In another possible implementation, the fourth message is a radio resource control (RRC) message or a media access control (MAC) message.

In another possible implementation, the fourth message further includes a long term evolution positioning protocol (LPP) message, and the sending unit is further configured to send the LPP message to the first network element.

According to a ninth aspect, an embodiment of this application provides a communication apparatus, including a processor and a memory. The memory is configured to store computer-executable instructions. When the communication apparatus operates, the processor executes the computer-executable instructions stored in the memory, so that the communication apparatus performs the positioning measurement method according to any one of the seventh aspect or the possible implementations of the seventh aspect.

According to a tenth aspect, an embodiment of this application provides a computer-readable storage medium. The computer-readable storage medium stores instructions. When the instructions are run on a computer, the computer performs the positioning measurement method according to any one of the seventh aspect or the possible implementations of the seventh aspect.

According to an eleventh aspect, an embodiment of this application provides a computer program product including instructions. When the computer program product is run on a computer, the computer performs the positioning measurement method according to any one of the seventh aspect or the possible implementations of the seventh aspect.

According to a twelfth aspect, an embodiment of this application provides a communication apparatus. The communication apparatus may be a chip system. The chip system may include a processor and a transceiver, to support the communication apparatus to implement the functions of any one of the seventh aspect or the possible implementations of the seventh aspect. In a possible design, the chip system further includes a memory. The memory is configured to store program instructions and data that are necessary for the communication apparatus. The chip system may include a chip, or may include a chip and another discrete component.

For technical effects achieved in any implementations of the eighth aspect to the twelfth aspect, refer to the technical effects achieved in any one of the seventh aspect or the possible implementations of the seventh aspect. Details are not described again.

According to a thirteenth aspect, an embodiment of this application provides still another positioning measurement method. The method may include: A second network element sends a first message to a first network element, where the first message indicates the first network element to obtain location information of a terminal, and the first message includes an identifier of an access network device that the terminal camps on and/or an identifier of a cell in which the access network device that the terminal camps on is located.

According to the method in the thirteenth aspect, the first network element may send a broadcast request and a measurement request to the related access network device based on the identifier of the access network device that the terminal camps on and/or the identifier of the cell in which the access network device that the terminal camps on is located. This avoids a case in which the terminal cannot receive the broadcast message sent by the access network device because the first network element sends the foregoing requests to the access network device that is far away from the terminal In this way, the terminal in a non-connected state may send the reference signal, for example, an SRS, by receiving a broadcast message from the access network device, without re-entering a connected state, and the access network device subsequently measures the reference signal. The first network element may determine the location information of the terminal based on a measurement result obtained by the access network device. In this way, during uplink positioning, a terminal in a non-connected state does not need to re-enter a connected state. Therefore, a delay in terminal positioning is reduced, energy consumption of the terminal is reduced, and positioning efficiency is improved.

In a possible implementation, the method further includes: The second network element receives a next generation application protocol (NGAP) message from the access network device, where the NGAP message includes a long term evolution positioning protocol (LPP) message. The second network element sends the LPP message to the first network element, where the LPP message is sent by the terminal to the access network device.

Based on this possible implementation, positioning assistance information (such as battery power information of the terminal and the SRS resource identifier of the SRS resource on which the terminal sends the reference signal) may be transmitted between the first network element and the terminal via the LPP message.

According to a fourteenth aspect, an embodiment of this application provides a communication apparatus. The communication apparatus may be a second network element, or a chip or a system-on-chip in the second network element. The communication apparatus may implement the functions performed by the second network element in the thirteenth aspect or the possible implementations of the thirteenth aspect. The functions may be implemented by using hardware, or may be implemented by hardware executing corresponding software. The hardware or the software includes one or more modules corresponding to the foregoing functions. For example, the communication apparatus may include a receiving unit, a sending unit, and the like.

The sending unit may be configured to send a first message to a first network element, where the first message indicates the first network element to obtain location information of a terminal, and the first message includes an identifier of an access network device that the terminal camps on and/or an identifier of a cell in which the access network device that the terminal camps on is located.

In a possible implementation, the receiving unit may be configured to receive a next generation application protocol (NGAP) message from the access network device, where the NGAP message includes a long term evolution positioning protocol (LPP) message. The sending unit is further configured to send the LPP message to the first network element.

According to a fifteenth aspect, an embodiment of this application provides a communication apparatus, including a processor and a memory. The memory is configured to store computer-executable instructions. When the communication apparatus operates, the processor executes the computer-executable instructions stored in the memory, so that the communication apparatus performs the positioning measurement method according to any one of the thirteenth aspect or the possible implementations of the thirteenth aspect.

According to a sixteenth aspect, an embodiment of this application provides a computer-readable storage medium. The computer-readable storage medium stores instructions. When the instructions are run on a computer, the computer performs the positioning measurement method according to any one of the thirteenth aspect or the possible implementations of the thirteenth aspect.

According to a seventeenth aspect, an embodiment of this application provides a computer program product including instructions. When the computer program product is run on a computer, the computer performs the positioning measurement method according to any one of the thirteenth aspect or the possible implementations of the thirteenth aspect.

According to an eighteenth aspect, an embodiment of this application provides a communication apparatus. The communication apparatus may be a chip system. The chip system may include a processor and a transceiver, to support the communication apparatus to implement the functions of any one of the thirteenth aspect or the possible implementations of the thirteenth aspect. In a possible design, the chip system further includes a memory. The memory is configured to store program instructions and data that are necessary for the communication apparatus. The chip system may include a chip, or may include a chip and another discrete component.

For technical effects achieved in any implementations of the fourteenth aspect to the eighteenth aspect, refer to the technical effects achieved in any one of the thirteenth aspect or the possible implementations of the thirteenth aspect. Details are not described again.

According to a nineteenth aspect, an embodiment of this application provides yet another positioning measurement method. The method may include: A terminal receives a second message broadcast by an access network device, where the second message indicates a terminal to send a reference signal. The terminal sends the reference signal.

According to the method in the nineteenth aspect, the terminal in a non-connected state may send the reference signal, for example, an SRS, by receiving the broadcast message from the access network device, without re-entering a connected state, and subsequently the access network device measures the reference signal. The first network element may determine the location information of the terminal based on a measurement result obtained by the access network device. In this way, during uplink positioning, the terminal in the non-connected state does not need to re-enter a connected state. Therefore, a delay in terminal positioning is reduced, energy consumption of the terminal is reduced, and positioning efficiency is improved.

In a possible implementation, the second message includes configuration information of a plurality of SRS resources. That the terminal sends the reference signal includes: The terminal selects a first SRS resource from the plurality of SRS resources based on the configuration information of the plurality of SRS resources, and sends the reference signal.

Based on this possible implementation, the terminal may obtain, based on the received second message, the SRS resource that may be used to send the reference signal. In this way, the terminal selects the SRS resource for sending the reference signal, and reliability of sending the reference signal by the terminal is improved.

In another possible implementation, the method further includes: The terminal sends an SRS resource identifier (or an SRS identifier) of the first SRS resource to the access network device.

Based on this possible implementation, the terminal may report, to the access network device, the SRS resource that is selected by the terminal for sending the reference signal, so that the access network device measures the reference signal without searching the SRS resources. In this way, efficiency of measuring the reference signal by the access network device is improved.

In another possible implementation, the access network device is an access network device that the terminal camps on. The method further includes: The terminal sends a fourth message to the access network device, where the fourth message includes an identifier of the terminal.

Based on this possible implementation, the first network element may associate the obtained measurement result with the corresponding terminal based on the identifier of the terminal, thereby improving accuracy of obtaining, by the first network element, the location information of the corresponding terminal based on the measurement result.

In another possible implementation, the fourth message is a radio resource control (RRC) message or a media access control (MAC) message.

In another possible implementation, the fourth message further includes a long term evolution positioning protocol (LPP) message.

Based on this possible implementation, positioning assistance information (such as battery power information of the terminal and the SRS resource identifier of the SRS resource on which the terminal sends the reference signal) may be transmitted between the first network element and the terminal via the LPP message.

According to a twentieth aspect, an embodiment of this application provides a communication apparatus. The communication apparatus may be a terminal, or a chip or a system-on-chip in the terminal. The communication apparatus may implement the functions performed by the terminal in the nineteenth aspect or the possible implementations of the nineteenth aspect. The functions may be implemented by using hardware, or may be implemented by hardware executing corresponding software. The hardware or the software includes one or more modules corresponding to the functions. For example, the communication apparatus may include a receiving unit, a sending unit, and the like.

The receiving unit may be configured to receive a second message broadcast by an access network device, where the second message indicates a terminal to send a reference signal. The sending unit may be configured to send the reference signal.

In a possible implementation, the second message includes configuration information of a plurality of SRS resources. The sending unit is specifically configured to: select a first SRS resource from the plurality of SRS resources based on the configuration information of the plurality of SRS resources, and send the reference signal.

In another possible implementation, the sending unit is further configured to send an SRS resource identifier (or an SRS identifier) of the first SRS resource to the access network device.

In another possible implementation, the access network device is an access network device that the terminal camps on. The sending unit is further configured to send a fourth message to the access network device, where the fourth message includes an identifier of the terminal.

In another possible implementation, the fourth message is a radio resource control (RRC) message or a media access control (MAC) message.

In another possible implementation, the fourth message further includes a long term evolution positioning protocol (LPP) message.

According to a twenty-first aspect, an embodiment of this application provides a communication apparatus, including a processor and a memory. The memory is configured to store computer-executable instructions. When the communication apparatus operates, the processor executes the computer-executable instructions stored in the memory, so that the communication apparatus performs the positioning measurement method according to any one of the nineteenth aspect or the possible implementations of the nineteenth aspect.

According to a twenty-second aspect, an embodiment of this application provides a computer-readable storage medium. The computer-readable storage medium stores instructions. When the instructions are run on a computer, the computer performs the positioning measurement method according to any one of the nineteenth aspect or the possible implementations of the nineteenth aspect.

According to a twenty-third aspect, an embodiment of this application provides a computer program product including instructions. When the computer program product is run on a computer, the computer performs the positioning measurement method according to any one of the nineteenth aspect or the possible implementations of the nineteenth aspect.

According to a twenty-fourth aspect, an embodiment of this application provides a communication apparatus. The communication apparatus may be a chip system. The chip system may include a processor and a transceiver, to support the communication apparatus to implement the functions of any one of the nineteenth aspect or the possible implementations of the nineteenth aspect. In a possible design, the chip system further includes a memory. The memory is configured to store program instructions and data that are necessary for the communication apparatus. The chip system may include a chip, or may include a chip and another discrete component.

For technical effects achieved in any implementations of the twentieth aspect to the twenty-fourth aspect, refer to the technical effects achieved in any one of the nineteenth aspect or the possible implementations of the nineteenth aspect. Details are not described again.

According to a twenty-fifth aspect, an embodiment of this application provides a communication system. The communication system may include the communication apparatus or the chip system according to any one of the second aspect to the sixth aspect, the communication apparatus or the chip system according to any one of the eighth aspect to the twelfth aspect, the communication apparatus or the chip system according to any one of the fourteenth aspect to the eighteenth aspect, and the communication apparatus or the chip system according to any one of the twentieth aspect to the twenty-fourth aspect.

DESCRIPTION OF EMBODIMENTS

In a mobile communication system, there are a plurality of positioning technologies for a terminal, for example, an uplink positioning technology and a downlink positioning technology. The uplink positioning technology is a positioning technology in which a plurality of base stations separately measure a sounding reference signal sent by a terminal, and then a location of the terminal is determined based on measurement results obtained by separately measuring the sounding reference signal by the plurality of base stations. The measurement result obtained by measuring the sounding reference signal by each base station may be time of arrival of the sounding reference signal from the terminal to the base station (namely, an uplink time difference of arrival positioning technology), an angle of arrival at which the sounding reference signal arrives at the base station (namely, an uplink angle-of-arrival positioning technology), or the like.

Figure 1:
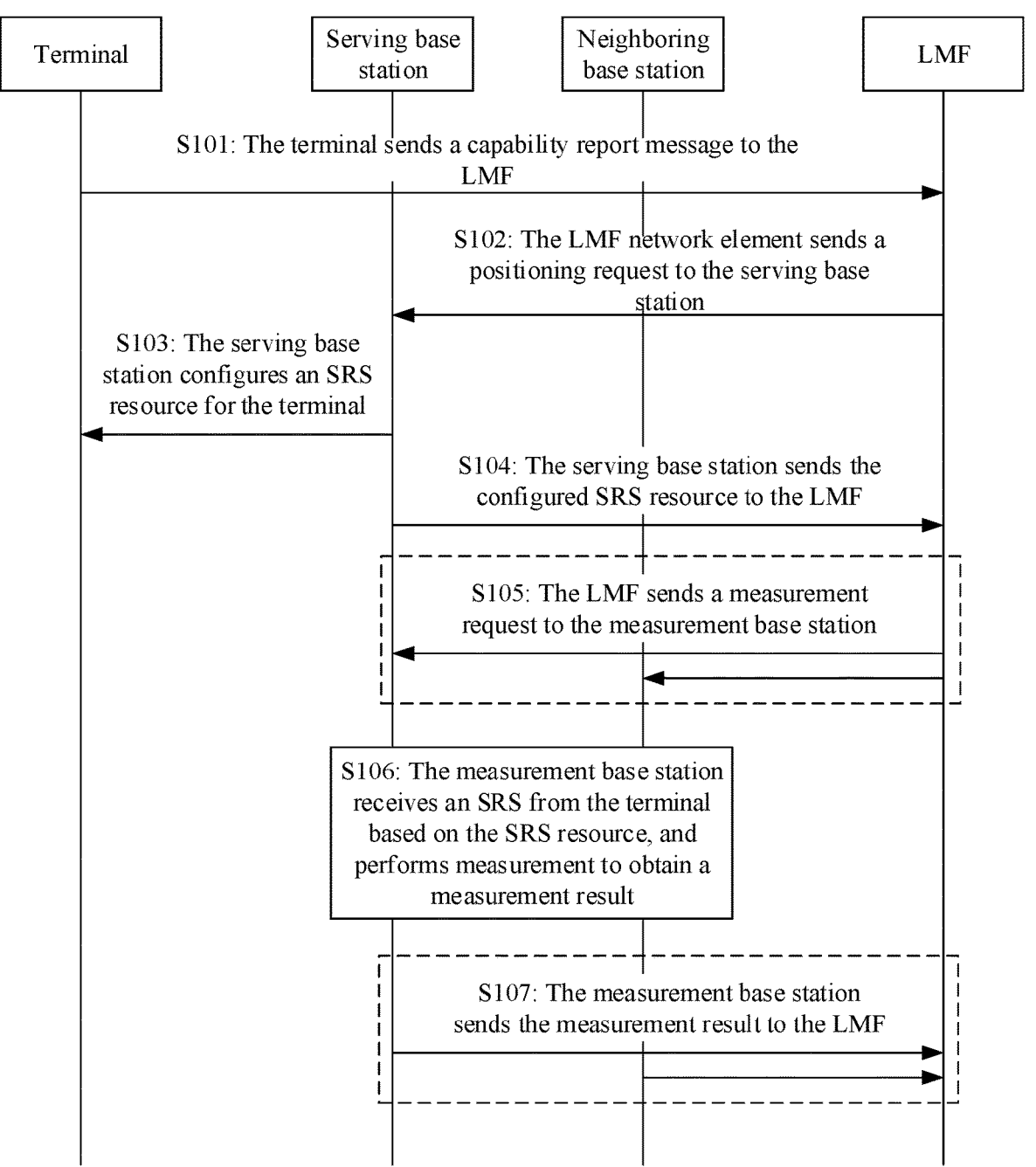
FIG. 1 is a flowchart of an uplink positioning technology in the existing technology.

FIG. 1 shows a specific procedure of an uplink positioning technology. As shown in FIG. 1, the procedure of the uplink positioning technology may be as follows.

S101: A terminal sends a capability report message to a location management function (LMF) network element. The capability report message may include a positioning technology supported by the terminal, and the like.

S102: The LMF network element sends a positioning request to a serving base station.

S103: The serving base station configures an SRS resource for the terminal.

S104: After the serving base station configures the SRS resource for the terminal, the serving base station may send the configured SRS resource to the LMF.

S105: The LMF may send a measurement request to a measurement base station. The measurement request indicates to perform measurement to locate the terminal. As shown in FIG. 1, the measurement base station may include the serving base station and/or a neighboring base station of the serving base station. The measurement request carries the SRS resource.

S106: The measurement base station receives an SRS from the terminal based on the SRS resource, and performs measurement to obtain a measurement result. The measurement result includes a relative time of arrival of the SRS.

S107: The measurement base station may send the measurement result to the LMF, and the LMF performs calculation based on the measurement result to determine location information of the terminal.

It can be learned that, in existing uplink positioning technologies, a serving base station connected to a terminal needs to configure an SRS resource for the terminal, and the terminal sends an SRS based on the configured SRS resource. Therefore, the terminal and the base station need to be in a connected state. When the terminal is in a non-connected state, the terminal needs to first enter the connected state before being located. This process is complex and time-consuming, resulting in high power consumption for locating the terminal in the non-connected state, and a long delay.

To resolve the foregoing problems, embodiments of this application provide a positioning measurement method. The method includes: After a first network element (for example, a location management function network element) receives, from a second network element (for example, an access management function network element), an indication of obtaining location information of a terminal, the first network element may request at least one access network device to broadcast a message. When the terminal receives the message broadcast by the access network device, the terminal may start to send a reference signal (for example, an SRS). The first network element may further request the at least one access network device to measure the reference signal. When the access network device receives a measurement request from the first network element, the access network device may measure the received reference signal, to obtain a corresponding measurement result. Then, the access network device sends the measurement result to the first network element.

In this application, the terminal may always be in a non-connected state, for example, an inactive state or an idle state. According to this method, the terminal in the non-connected state may receive the broadcast message from the access network device, so that the terminal may send the reference signal, for example, the SRS, without re-entering a connected state. In this way, the access network device subsequently measures the reference signal. The first network element may determine the location information of the terminal based on the measurement result obtained by the access network device. During uplink positioning, a terminal in a non-connected state does not need to re-enter a connected state. Therefore, a delay in terminal positioning is reduced, energy consumption of the terminal is reduced, and positioning efficiency is improved.

Descriptions are made in the following with reference to the accompanying drawings of the specification. The following describes in detail a positioning measurement method according to embodiments of this application.

The positioning measurement method according to embodiments of this application may be applied to various communication systems, for example, a long term evolution (LTE) system, a 5th generation (5G) mobile communication system, a wireless fidelity (Wi-Fi) system, a future communication system, or a system integrating a plurality of communication systems. This is not limited in embodiments of this application. 5G may also be referred to as new radio (NR).

The positioning measurement method according to embodiments of this application is applied various communication scenarios, for example, applied to one or more of the following communication scenarios: enhanced mobile broadband (eMBB), ultra reliable low latency communication (URLLC), machine type communication (MTC), massive machine type communications (mMTC), device to device (D2D), vehicle to everything (V2X), vehicle to vehicle (V2V), an Internet of things (IoT), and the like.

Figure 2:
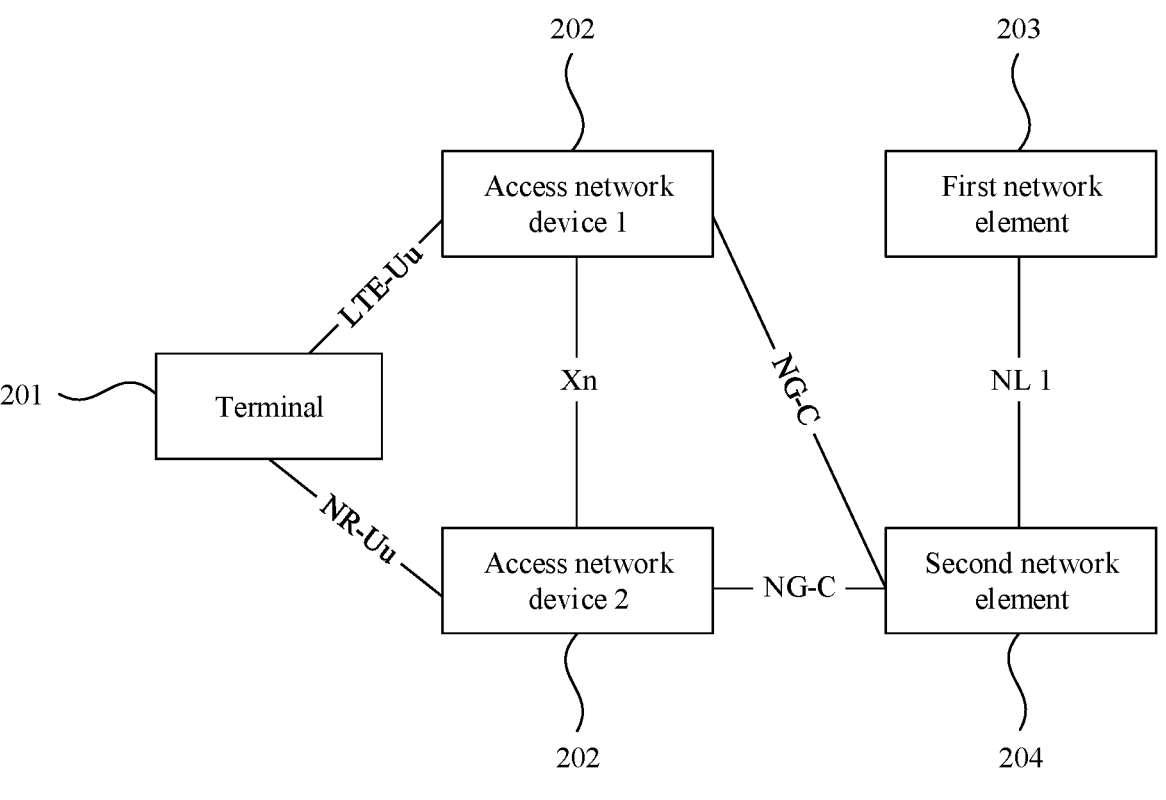
FIG. 2 is a schematic diagram of an architecture of a communication system according to an embodiment of this application.

FIG. 2 is a schematic diagram of a structure of a communication system according to an embodiment of this application. As shown in FIG. 2, the communication system may include a terminal 201, a plurality of access network devices 202 (for example, an access network device 1 and an access network device 2 in FIG. 2), a first network element 203 (for example, an LMF network element), and a second network element 204 (for example, an access management function (AMF) network element). The access network devices 202 may communicate with each other in a wired or wireless manner, for example, communicate with each other through an Xn interface in FIG. 2. The access network device 202 and the terminal 201 may communicate with each other in a wireless manner. For example, in FIG. 2, the access network device 1 is a next generation-evolved NodeB (ng-eNB), and communicates with the terminal 201 through a long term evolution-user to network interface universal (LTE-Uu). For another example, in FIG. 2, the access network device 2 is a next generation NodeB (gNB), and communicates with the terminal 201 through a new radio-universal user-network interface (NR-Uu). The access network device 202 and the second network element 204 may communicate with each other in a wireless or wired manner, for example, communicate with each other through an NG-C interface in FIG. 2. The first network element 203 and the second network element 204 may also communicate with each other in a wired or wireless manner, for example, communicate with each other through an NL 1 interface in FIG. 2.

The terminal may switch from a connected state to anon-connected state in an RRC release process. The terminal in the non-connected state may camp on an original cell, and uplink transmission and/or downlink transmission are/is performed between the terminal and an access network device in the original cell based on a transmission parameter of the terminal in the original cell.

It should be noted that FIG. 2 is only an example framework diagram, and quantities of nodes, access network devices, and the like included in FIG. 2 are not limited. In addition to functional nodes shown in FIG. 2, other nodes may be further included, for example, a core network device, a gateway device, and an application server. This is not limited.

The access network device is mainly configured to implement at least one function of the terminal, such as resource scheduling, radio resource management, and radio resource control. Specifically, the access network device may include any one of a base station, a wireless access point, a transmission reception point (TRP), a transmit point (transmission point, TP), and another access node. In embodiments of this application, an apparatus configured to implement the function of the access network device may be an access network device, or may be an apparatus that may support the access network device to implement the function, for example, a chip system. The apparatus may be installed in the access network device, or used together with the access network device. In the technical solutions provided in embodiments of this application, the technical solutions provided in embodiments of this application are described by using an example in which the apparatus configured to implement the function of the access network device is an access network device.

The terminal may be user equipment (UE), a mobile station (MS), a mobile terminal (MT), or the like. Specifically, the terminal may be a mobile phone, a tablet computer, or a computer with a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like. In embodiments of this application, an apparatus configured to implement the function of the terminal may be a terminal device, or may be an apparatus that may support the terminal to implement the function, for example, a chip system. The apparatus may be installed in the terminal, or used together with the terminal. The positioning measurement method provided in embodiments of this application is described by using an example in which the apparatus configured to implement the function of the terminal is a terminal device.

An AMF network element is mainly responsible for work such as access authentication and mobility management for terminals, and signaling exchange between functional network elements, for example, user registration management, user connection management, user registration and network access management, tracking area update management, user authentication for cell handover, and key security management.

An LMF network element is mainly responsible for providing a positioning service for terminals and other devices.

With reference to the communication system shown in FIG. 2, the following describes the positioning measurement method according to embodiments of this application. Actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

Figure 3:
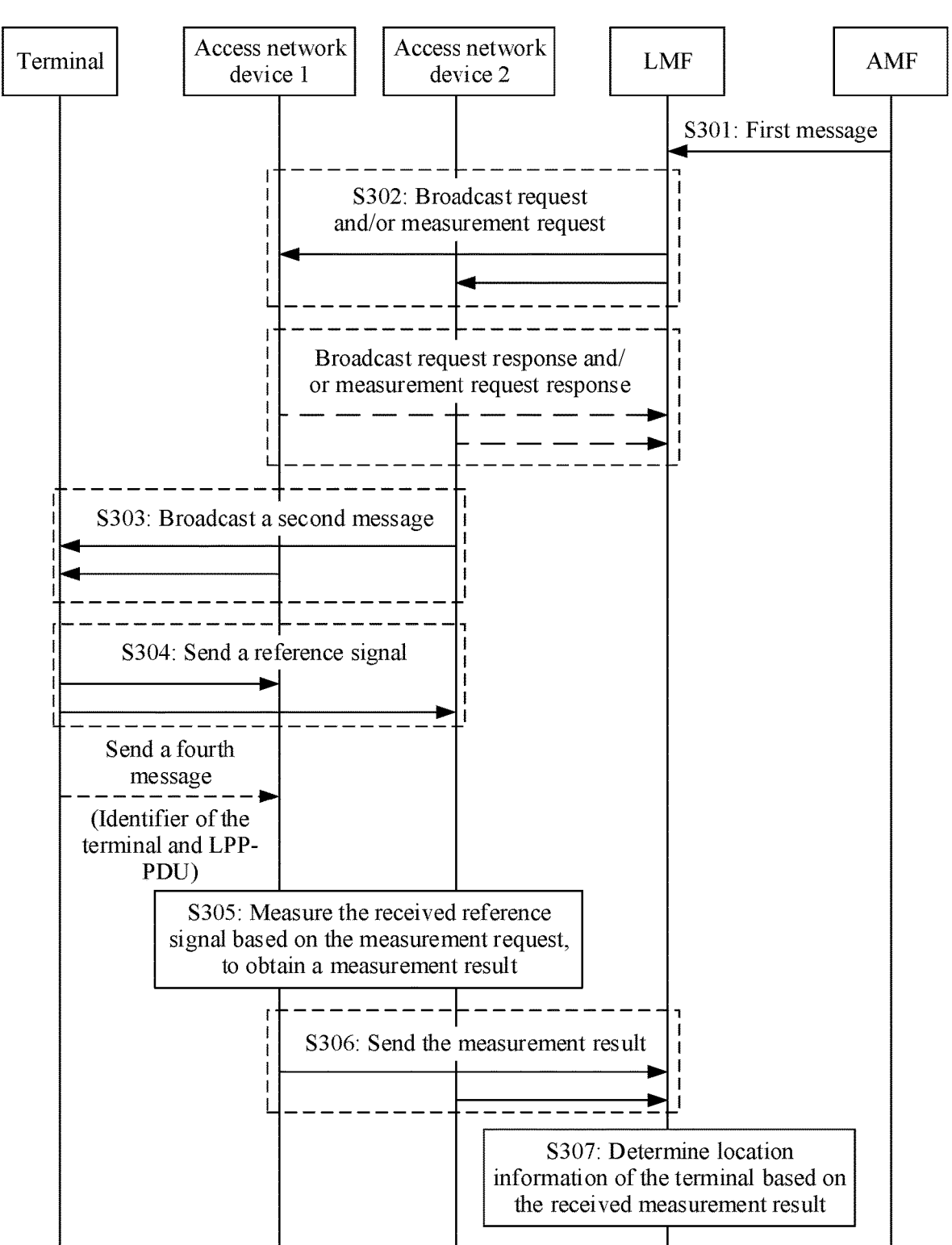
FIG. 3 is a flowchart of a positioning measurement method according to an embodiment of this application.

In an example in which a first network element is an LMF network element and a second network element is an AMF network element, FIG. 3 is a flowchart of a positioning measurement method according to an embodiment of this application. As shown in FIG. 3, the method may include the following S301 to S307.

S301: An AMF network element sends a first message to an LMF network element.

The first message indicates the LMF network element to obtain location information of a terminal. In other words, the LMF network element may determine, based on the first message sent by the AMF network element, to perform uplink positioning on the terminal.

Figure 4:
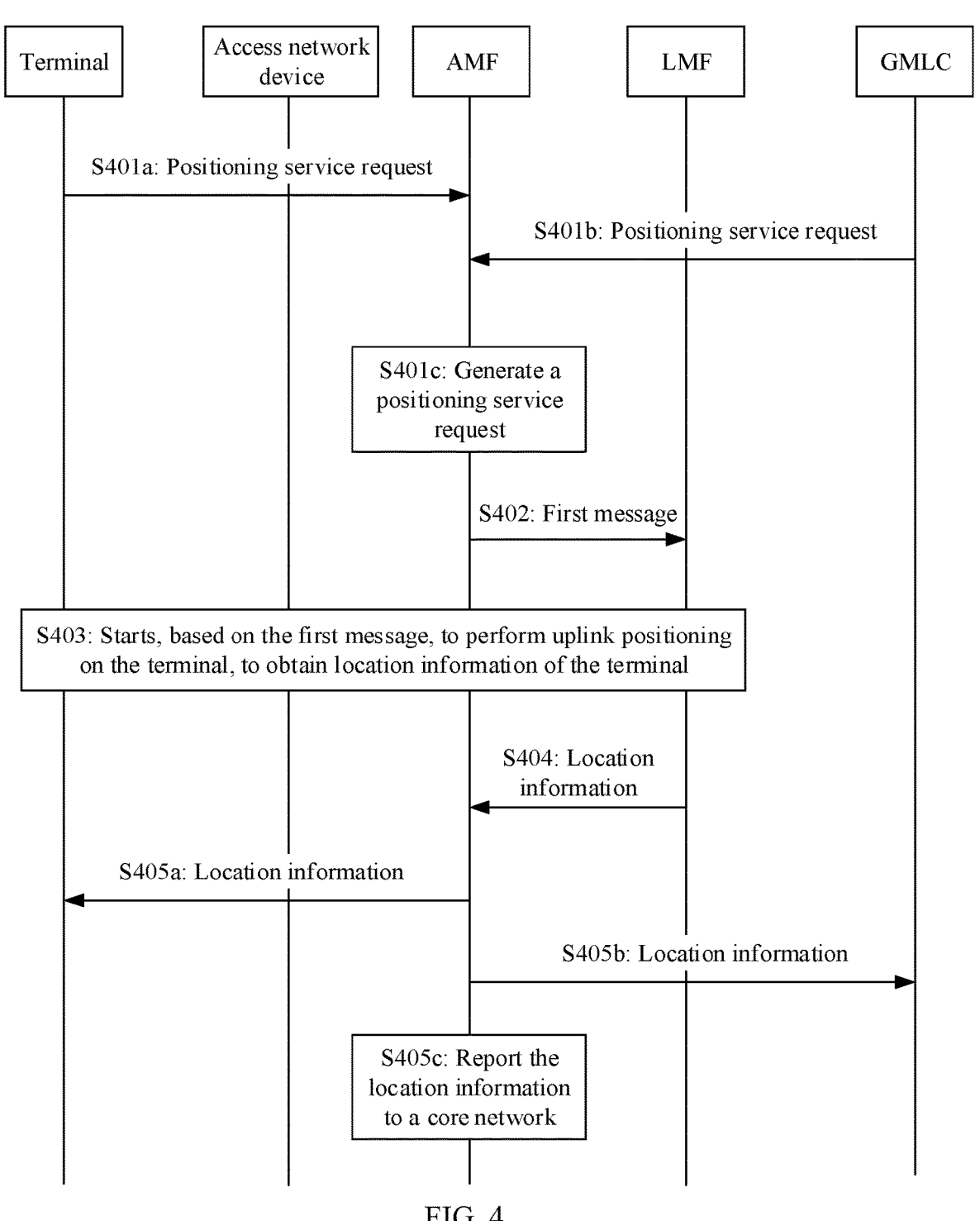
FIG. 4 is a flowchart of another positioning measurement method according to an embodiment of this application.

In some possible implementations, the AMF network element may send the first message to the LMF network element based on a received positioning service request. The positioning service request may be from a terminal, a gateway mobile location center (GMLC), or a core network. For example, as shown in FIG. 4, a positioning procedure according to this embodiment may be as follows. S401*a*: A terminal sends a positioning service request to an AMF network element; S401*b*: A GMLC sends a positioning service request to an AMF network element; or S401*c*: An AMF network element generates a positioning service request. S402: The AMF network element sends a first message to an LMF network element based on the received positioning service request. S403: The LMF network element starts, based on the first message, to perform an uplink positioning procedure on the terminal, to obtain location information of the terminal. After the LMF network element determines the location information of the terminal, in S404, the LMF network element may send the location information of the terminal to the AMF network element. Then, the AMF network element performs, based on a source of the positioning service request, S405*a* in which the AMF network element sends the location information to the terminal, S405*b* in which the AMF network element sends the location information of the terminal to the GMLC, or S405*c* in which the AMF network element reports the location information of the terminal to the core network. The positioning service request sent by the GMLC may be a positioning service request sent by an external application via the GMLC.

S302: The LMF network element sends, to at least one access network device (for example, an access network device 1 and an access network device 2 in FIG. 3), a message for requesting the access network device to send a broadcast, and/or requesting the access network device to measure a reference signal sent by the terminal. For example, the LMF network element may send a broadcast request and/or a measurement request. For example, the message may be a new radio positioning protocol A (NRPPa) message.

The broadcast request indicates to broadcast a second message. To be specific, when the access network device receives the broadcast request, the access network device may start to broadcast the second message. The second message may be a message indicating the terminal to send the reference signal.

The measurement request indicates the access network device to measure the reference signal for positioning.

Correspondingly, after receiving the broadcast request and the measurement request, the access network device may further feed back a broadcast request response and/or a measurement request response to the LMF, to indicate that the access network device has received the broadcast request and the measurement request.

It should be noted that the at least one access network device may include an access network device (for example, the access network device 1 in FIG. 3) on which the terminal (or a to-be-located terminal) camps, and a neighboring access network device (for example, the access network device 2 in FIG. 3) of the access network device that the terminal camps on.

In some possible implementations, the first message sent by the AMF network element to the LMF network element may include an identifier of the access network device that the terminal camps on (for example, an identifier of a base station that the terminal camps on) and/or an identifier of a cell in which the access network device that the terminal camps on is located (for example, an identifier of a cell that the terminal camps on). In this case, after the LMF network element receives the first message, the LMF network element may send, based on the foregoing identifier in the first message, the broadcast request and the measurement request to the corresponding access network device that the terminal camps on, and send the broadcast request and the measurement request to the neighboring access network device of the access network device that the terminal camps on. In this way, this avoids a case in which the terminal cannot receive the second message broadcast by the access network device because an access network device selected when the LMF network element sends the broadcast request and the measurement request is far away from the terminal.

In some possible implementations, the LMF network element may send the broadcast request and the measurement request to the access network device via one message. For example, the LMF network element sends a third message to the access network device, where the third message includes the broadcast request and the measurement request. In some other possible implementations, the LMF network element may further send the broadcast request and the measurement request to the access network device respectively via two messages. This is not limited herein.

Optionally, the foregoing measurement request may include a measurement item.

The measurement item is a target parameter that is of the reference signal and that is to be measured by the access network device. To be specific, when subsequently measuring the reference signal of the terminal, the access network device may measure a related measurement item of the reference signal. The measurement item may be set based on a specific positioning technology used for uplink positioning. For example, if an uplink time difference of arrival positioning technology is used, the measurement item may be a relative time of arrival (RTOA) of a reference signal when the access network device receives the reference signal. If an uplink angle-of-arrival positioning technology is used, the measurement item may be an angle-of-arrival (AOA) of a reference signal when the access network device receives the reference signal. Similarly, the measurement item may also be reference signal received power (RSRP) of a reference signal, reference signal received quality (RSRQ) of a reference signal, or the like when the access network device receives the reference signal. Optionally, in some possible implementations, the measurement request may further include a measurement period and the like. This is not limited herein.

Optionally, in this embodiment of this application, when the LMF network element determines to stop locating the terminal, the LMF network element may send an indication message to the foregoing access network device to indicate the access network device to stop broadcasting, so that access network devices stop broadcasting second messages, and the terminal stops sending reference signals. In some other possible implementations, when the LMF network element determines to stop locating the terminal, the LMF network element may further send a broadcast request to the access network device, so that the access network device broadcasts, based on the broadcast request, a message for requesting the terminal to stop sending the reference signal.

S303: The access network device broadcasts the second message based on the broadcast request.

The second message may indicate the terminal to send the reference signal (for example, an SRS).

In some possible implementations, the second message may include configuration information of a plurality of SRS resources of the reference signal. For example, when the reference signal sent by the terminal is the SRS, the second message may include an SRS resource set of the SRS and an SRS resource identifier (or an SRS identifier) corresponding to each SRS resource.

S304: The terminal sends the reference signal based on the received second message broadcast by the access network device.

In some possible implementations, the second message sent by the access network device may include the configuration information of the plurality of SRS resources of the reference signal. The terminal may select one SRS resource from these SRS resources, and send the reference signal based on configuration information of the selected SRS resource. For example, when the second message includes the SRS resource set of the SRS and the SRS resource identifier corresponding to each SRS resource, after receiving the second message, the terminal may select an SRS resource from the SRS resource set, and send the SRS based on the configuration information of the SRS resource.

Optionally, in this embodiment of this application, the terminal may further send an identifier of the terminal to an access network device that is in the at least one access network device and that the terminal camps on (for example, as shown in FIG. 3, when the access network device 1 is an access network device that the terminal camps on, the terminal sends, to the access network device 1, a fourth message including the identifier of the terminal), so that when the access network device that the terminal camps on measures the reference signal of the terminal to obtain a measurement result, the measurement result is associated with the terminal. It should be noted that there is no limitation of a sequence in which the terminal sends the reference signal and the terminal sends the identifier of the terminal identifier to the base station that the terminal camps on.

In some optional implementations, the terminal may send, via an RRC message (that is, the RRC message is used as the foregoing fourth message), the identifier of the terminal to the access network device that the terminal camps on. For example, the RRC message may be an RRC message based on a signaling radio bearer 0 (SRB 0). The SRB 0 uses a CCCH logical channel, and is used in an establishment or a re-establishment process of RRC connection. Therefore, the terminal in the non-connected state may still send the foregoing RRC message to the access network device that the terminal camps on, where the RRC message carries data. In some other optional implementations, the terminal may further send, via a medium access control (MAC) message, the identifier of the terminal to the access network device that the terminal camps on.

Optionally, the terminal may further send, to the access network device that the terminal camps on, a protocol data unit (PDU) including a long term evolution positioning protocol (LPP) message. The PDU of the LPP message may be included in the same message that is sent by the terminal and that includes the identifier of the terminal. For example, as shown in FIG. 3, when the access network device 1 is the access network device that the terminal camps on, the terminal sends, to the access network device 1, the fourth message including the identifier of the terminal and the LPP-PDU. The LPP message may include battery power information of the terminal, or other information defined in the LPP protocol. This is not limited herein.

S305: The access network device measures the received reference signal based on the measurement request, to obtain the measurement result.

Before the access network device measures the reference signal, the access network device needs to first receive the reference signal sent by the terminal. When the terminal sends the reference signal based on one SRS resource selected from the plurality of SRS resources, in some possible implementations, the access network device may search for the reference signal based on the plurality of SRS resources, to receive the reference signal of the terminal on the corresponding SRS resource. For example, the terminal selects an SRS resource from the SRS resource set, and sends the SRS based on the SRS resource. The access network device may search for the SRS on each SRS resource based on the SRS resource set, to finally receive the SRS from the terminal on the SRS resource selected by the terminal.

Optionally, the measurement result obtained by the access network device through measurement may further include a timestamp obtained when the reference signal is measured, and/or the SRS resource identifier (or the SRS identifier (SRS ID)) of the SRS resource for the received reference signal of the terminal. For example, if the terminal sends the reference signal based on a first SRS resource, the SRS resource identifier is an SRS resource identifier of the first SRS resource. In this way, after receiving the measurement result, the LMF network element may subsequently associate, based on the timestamp and/or the SRS resource identifier of the first SRS resource, the measurement result of the access network device that the terminal camps on with a measurement result of the neighboring access network device of the access network device. For example, if time-stamps and/or SRS resource identifiers of the first SRS resource that are included in received measurement results are the same, or a time identified by the timestamps is less than a specific threshold, it is determined that these measurement results are results obtained by measuring reference signals sent by the same terminal. The SRS resource identifier of the SRS resource for the received reference signal of the terminal may be an SRS resource identifier of an SRS resource that is used for the reference signal and that is determined by the access network device when the access network device measures the received reference signal of the terminal, for example, the SRS resource identifier of the first SRS resource. Alternatively, the SRS resource identifier of the SRS resource for the received reference signal may be the SRS resource identifier of the first SRS resource that is sent by the access device to the access network device after the terminal selects, from the plurality of SRS resources, an SRS resource (for example, the first SRS resource) for sending the reference signal.

S306: The access network device sends the measurement result to the LMF network element.

Optionally, when the access network device that the terminal camps on receives the identifier of the terminal sent by the terminal, the access network device may further send the identifier of the terminal to the LMF network element, so that the LMF network element associates the measurement result with the terminal. The identifier of the terminal and the measurement result that are sent by the access network device that the terminal camps on to the LMF network element may be sent via a same message, or may be sent via different messages. This is not limited herein.

In some possible implementations, when the access network device receives the PDU of the LPP message from the terminal, for example, the RRC message sent by the terminal to the access network device includes the LPP-PDU, the access network device may further send the PDU including the LPP message to the LMF network element. The access network device may send, to the LMF network element via an NRPPa message, the PDU including the LPP message. For example, the LPP-PDU and the measurement result may be sent to the LMF via a same NRPPa message, or may be sent to the LMF via different NRPPa messages. The access network device may further send a next generation application protocol (NGAP) message to the AMF network element to carry the foregoing PDU including the LPP message. After receiving the NGAP message carrying the LPP-PDU, the AMF network element may send the PDU including the LPP message to the LMF network element.

S307: The LMF network element determines the location information of the terminal based on the received measurement result.

The location information of the terminal may indicate a specific address location of the terminal. When the LMF network element receives the identifier of the terminal sent by the access network device, the LMF network element may determine, based on the identifier of the terminal, a terminal device to which the measurement result is related.

Figure 5:
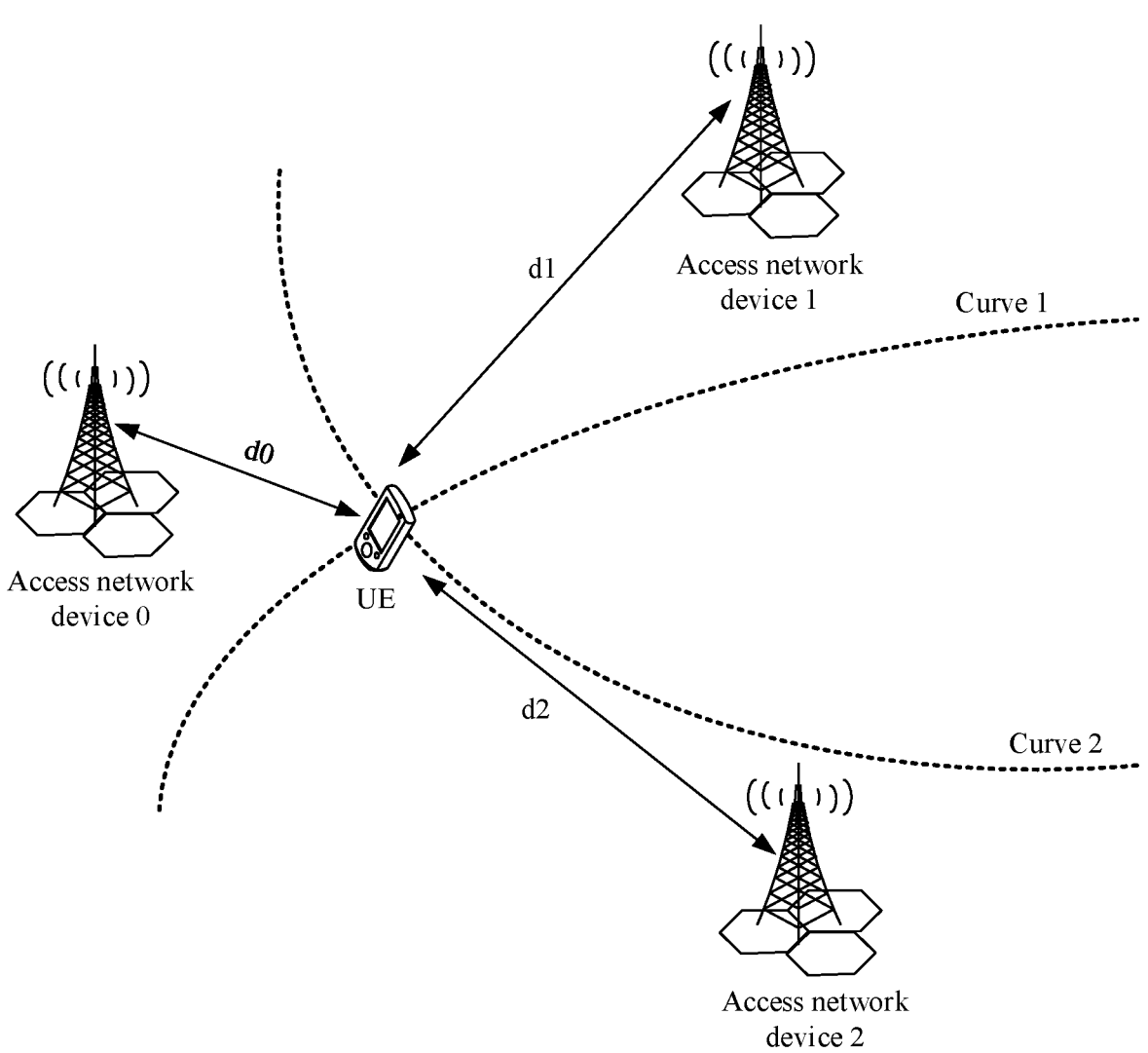
FIG. 5 is a schematic diagram of a positioning measurement principle according to an embodiment of this application.

For example, the uplink time difference of arrival (UL-TDOA) positioning technology is used as an example. For a process in which an LMF network element determines a location of a terminal based on a measurement result, refer to FIG. 5. As shown in FIG. 5, two hyperbola branches are derived using two access network devices. For example, one branch curve of the hyperbola is formed based on a difference d0–d1 between a distance from the terminal (for example, UE in FIG. 5) to an access network device 0 and a distance from the terminal to an access network device 1. The other branch curve is formed based on a difference d0–d2 between the distance from the terminal to the access network device 0 and a distance from the terminal to an access network device 2. An intersection point is determined based on the two hyperbolas branches, and further an accurate location of the terminal device is obtained based on the intersection point together with an additional condition (for example, geographical location information of the access network devices). It should be noted that the location of the terminal may be determined by using another method. A location calculation method is not limited in this application.

Figure 6:
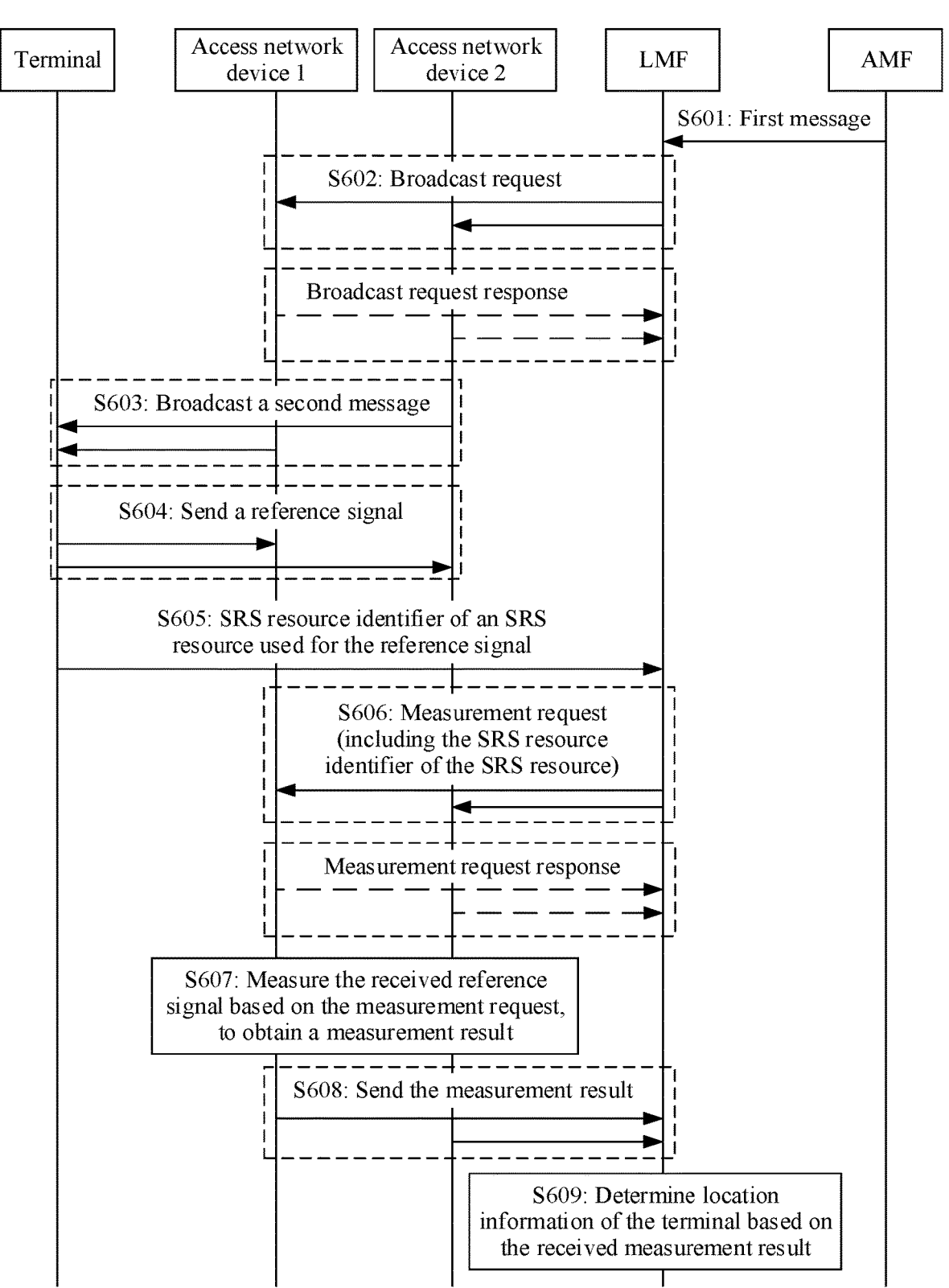
FIG. 6 is a flowchart of still another positioning measurement method according to an embodiment of this application.

In still the example in which a first network element is an LMF network element and a second network element is an AMF network element, FIG. 6 is a flowchart of still another positioning measurement method according to an embodiment of this application. As shown in FIG. 6, the method may include the following S601 to S609.

S601: An AMF network element sends a first message to an LMF network element. For details, refer to related descriptions of S301 in the method shown in FIG. 3. Details are not described herein again.

S602: The LMF network element sends, to at least one access network device (for example, an access network device 1 and an access network device 2 in FIG. 6), a message for requesting the access network device to send a broadcast, for example, sends a broadcast request. Optionally, after the access network device receives the broadcast request, the access network device may further send a broadcast request response to the LMF, to indicate that the access network device has received the broadcast request. For details, refer to descriptions about the broadcast request in S302 in the method shown in FIG. 3. Details are not described herein again.

S603: The access network device broadcasts a second message based on the broadcast request. For details, refer to related descriptions of S303 in the method shown in FIG. 3. Details are not described herein again.

S604: A terminal sends a reference signal based on the received second message broadcast by the access network device. For details, refer to related descriptions of S304 in the method shown in FIG. 3. Details are not described herein again.

S605: The terminal sends, to the LMF, an SRS resource identifier (resource ID) (or an SRS identifier (SRS ID)) of an SRS resource used for the reference signal. For example, the reference signal is an SRS.

It should be noted that how the terminal specifically sends the SRS resource identifier (or the SRS identifier) to the LMF is not limited herein. For example, the terminal may send the SRS resource identifier or the SRS identifier to the LMF via an LPP message. Specifically, the terminal may send an LPP-PDU to the access network device via an RRC message or a MAC message, and then the access network device sends the LPP-PDU to the LMF via an NRPPa message. The LPP message included in the LPP-PDU includes the SRS resource identifier or the SRS identifier. Alternatively, the terminal may send the LPP-PDU to the access network device via an RRC message or a MAC message. Then, the access network device sends the LPP-PDU to the AMF through an NG interface message, and the AMF sends the LPP-PDU to the LMF through an NL 1 interface. The LPP message included in the LPP-PDU includes the SRS resource identifier or the SRS identifier. Alternatively, the terminal may send the SRS resource identifier or the SRS identifier to the access network device via an RRC message or a MAC message. Then, the access network device sends the SRS resource identifier or the SRS identifier to the LMF via an NRPPa message.

It should be noted that a sequence of S604 and S605 is not limited. For example, S604 and S605 may be performed simultaneously, or S605 may be performed before S604.

S606: The LMF sends, to at least one access network device (for example, the access network device 1 and the access network device 2 in FIG. 6), a message for requesting the access network device to measure the reference signal sent by the terminal, for example, sends a measurement request.

The message may include an SRS resource identifier (or an SRS identifier) that is sent by the terminal and that is received by the LMF, so that the access network device measures a reference signal of the terminal on a corresponding SRS resource based on the SRS resource identifier.

After the access network device receives the measurement request, the access network device may further send a measurement request response to the LMF, to indicate that the access network device has received the measurement request.

It should be noted that for S606, refer to related descriptions of the measurement request in S302 in the method shown in FIG. 3. Details are not described herein again.

S607: The access network device measures the received reference signal based on the measurement request, to obtain a measurement result. For details, refer to related descriptions of S305 in the method shown in FIG. 3. Details are not described herein again.

S608: The access network device sends the measurement result to the LMF network element. For details, refer to related descriptions of S306 in the method shown in FIG. 3. Details are not described herein again.

S609: The LMF network element determines the location information of the terminal based on the received measurement result. For details, refer to related descriptions of S307 in the method shown in FIG. 3. Details are not described herein again.

According to the method in the foregoing embodiment, the terminal in a non-connected state may receive the broadcast message from the access network device, so that the terminal may send the reference signal, for example, an SRS, without re-entering a connected state. In this way, the access network device subsequently measures the reference signal. The LMF network element may determine the location information of the terminal based on the measurement result obtained by the access network device. During uplink positioning, a terminal in a non-connected state does not need to re-enter a connected state. Therefore, a delay in terminal positioning is reduced, energy consumption of the terminal is reduced, and positioning efficiency is improved.

The foregoing mainly describes the solutions provided in embodiments of this application from the perspective of interaction between nodes. It may be understood that to implement the foregoing functions, the nodes such as the terminal, the first network element, the second network element, and the access network device include corresponding hardware structures and/or software modules for performing the functions. Persons skilled in the art should be easily aware that steps in examples described with reference to embodiments disclosed in this specification can be implemented in a form of hardware, software, or a combination of hardware and computer software in the methods according to embodiments of this application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In embodiments of this application, the terminal, the first network element, and the second network element may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in embodiments of this application, module division is an example, and is merely logical function division. In actual implementation, another division manner may be used.

Figures 7, 8:
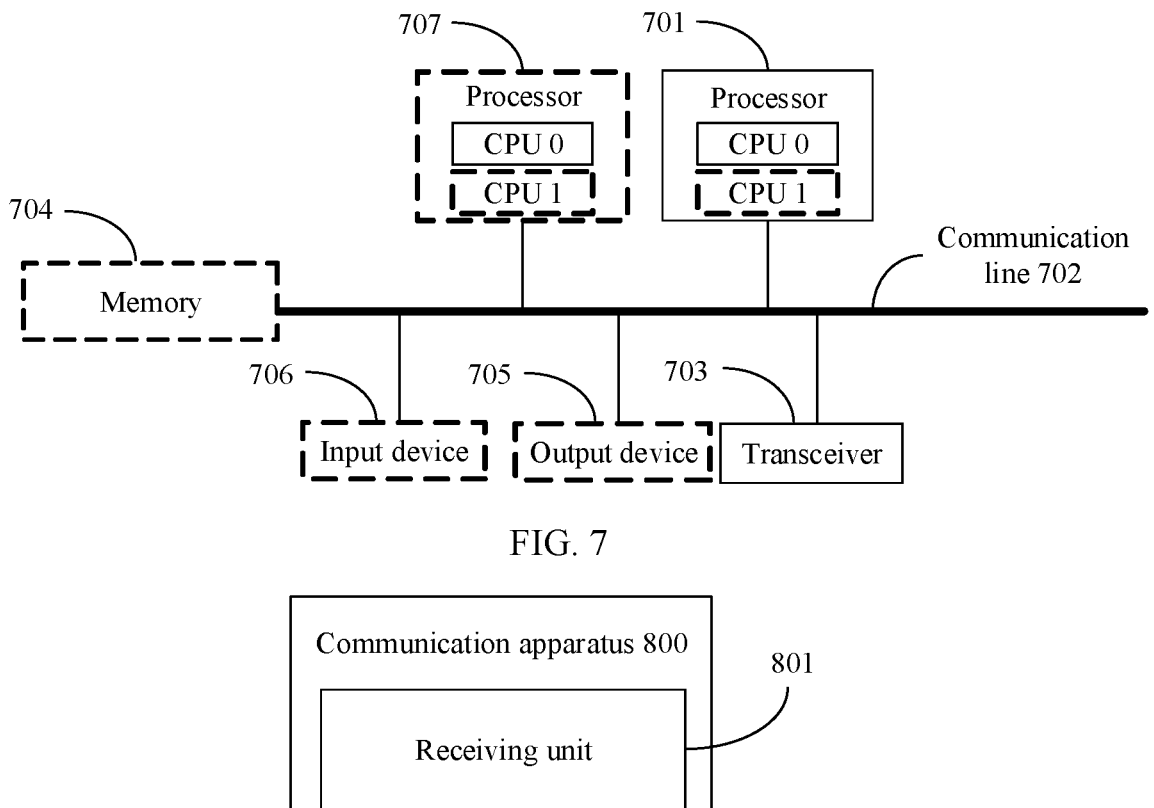
FIG. 7 is a schematic diagram of composition of a communication apparatus according to an embodiment of this application.
FIG. 8 is a schematic diagram of composition of another communication apparatus according to an embodiment of this application.

In a specific implementation, devices shown in this application, such as the terminal, the first network element, the second network element, and the access network device may be in a composition structure shown in FIG. 7 or include components shown in FIG. 7. FIG. 7 is a schematic diagram of a structure of a communication apparatus according to an embodiment of this application. When the communication apparatus has the functions of the terminal in embodiments of this application, the communication apparatus may be a terminal, or a chip or a system-on-a-chip in the terminal. When the communication apparatus has the functions of the access network device in embodiments of this application, the communication apparatus may be an access network device, or a chip or a system-on-a-chip in the access network device. When the communication apparatus has the functions of the first network element in embodiments of this application, the communication apparatus may be a first network element or a chip or a system-on-chip in the first network element. When the communication apparatus has the functions of the second network element in embodiments of this application, the communication apparatus may be a second network element or a chip or a system-on-chip in the second network element.

As shown in FIG. 7, the communication apparatus may include a processor 701, a communication line 702, and a transceiver 703. The processor 701, a memory 704, and the transceiver 703 may be connected through the communication line 702. In an example, the processor 701 may include one or more CPUs, for example, a CPU 0 and a CPU 1 in FIG. 7.

In an optional implementation, the communication apparatus may include a plurality of processors. For example, in addition to the processor 701 in FIG. 7, the communication apparatus may further include a processor 707.

The processor 701 may be a central processing unit (CPU), a general-purpose processor, a network processor (NP), a digital signal processor (DSP), a microprocessor, a microcontroller, a programmable logic device (PLD), or any combination thereof. The processor 701 may alternatively be another apparatus having a processing function, for example, a circuit, a component, or a software module.

The communication line 702 is configured to transfer information between the components included in the communication apparatus.

The transceiver 703 is configured to communicate with another device or another communication network. The another communication network may be an Ethernet network, a radio access network (RAN), a wireless local area network (WLAN), or the like. The transceiver 703 may be an interface circuit, a pin, a radio frequency module, a transceiver, or any apparatus that can implement communication.

Further, the communication apparatus may further include the memory 704. The memory 704 is configured to store instructions. The instructions may be a computer program.

The memory 704 may be a read-only memory (ROM) or another type of static storage device that may store static information and/or instructions, may be a random access memory (RAM) or another type of dynamic storage device that may store information and/or instructions, or may be an electrically erasable programmable read-only memory (EE-PROM), a compact disc read-only memory (CD-ROM) or other optical disk storage, optical disc storage, or a magnetic disk storage medium or another magnetic storage device. The optical disc storage includes a compact disc, a laser disc, an optical disc, a digital versatile disc, a Blu-ray disc, and the like.

It should be noted that the memory 704 may be independent of the processor 701, or may be integrated with the processor 701. The memory 704 may be configured to store instructions, program code, some data, or the like. The memory 704 may be located in the communication apparatus, or may be located outside the communication apparatus. This is not limited. When executing the instructions stored in the memory 704, the processor 701 may implement the positioning measurement method according to the foregoing embodiments of this application.

In an optional implementation, the communication apparatus further includes an output device 705 and an input device 706. For example, the input device 706 is a device, such as a keyboard, a mouse, a microphone, or a joystick, and the output device 705 is device, such as a display or a speaker.

It should be noted that the communication apparatus may be a desktop computer, a portable computer, a network server, a mobile phone, a tablet computer, a wireless terminal, an embedded device, a chip system, or a device having a structure similar to that in FIG. 7. In addition, a composition structure shown in FIG. 7 does not constitute a limitation on the communication apparatus. In addition to the components shown in FIG. 7, the communication apparatus may include more or fewer components than those shown in the figure, or some components may be combined, or different component arrangements may be used.

In this embodiment of this application, the chip system may include a chip, or may include a chip and another discrete component.

FIG. 8 is a diagram of a structure of a communication apparatus 800. The communication apparatus 800 may be a first network element, a chip or a system-on-chip in the first network element, another apparatus that may implement the function of the first network element in the foregoing methods, or the like. The communication apparatus 800 may be configured to perform the function of the first network element in the foregoing method embodiments. In a possible implementation, the communication apparatus 800 shown in FIG. 8 includes a receiving unit 801, a sending unit 802, and a processing unit 803.

The receiving unit 801 may be configured to receive a first message from a second network element, where the first message indicates a first network element to obtain location information of a terminal. The sending unit 802 may be configured to send a broadcast request and a measurement request to at least one access network device, where the broadcast request indicates to broadcast a second message, the measurement request indicates to measure a reference signal, the second message indicates the terminal to send the reference signal, and the at least one access network device includes an access network device that the terminal camps on.

In a possible implementation, the sending unit 802 is specifically configured to send a third message to the at least one access network device, where the third message includes the broadcast request and the measurement request.

In another possible implementation, the measurement request includes a measurement item, and the measurement item indicates a target parameter for measuring the reference signal.

In another possible implementation, the first message includes an identifier of the access network device that the terminal camps on and/or an identifier of a cell in which the access network device that the terminal camps on is located.

In another possible implementation, the receiving unit 801 is further configured to receive a measurement result from the at least one access network device, and the processing unit 803 is configured to determine the location information of the terminal based on the measurement result.

In another possible implementation, the receiving unit 801 is further configured to receive an identifier of the terminal from the access network device that the terminal camps on, where the identifier of the terminal is from the terminal.

In another possible implementation, the measurement result includes a timestamp and/or an SRS resource identifier of a first SRS resource that are/is used by the first network element to determine that the measurement result is obtained by measuring the terminal. The timestamp indicates time at which the at least one access network device measures the reference signal, and the first SRS resource is used by the terminal to send the reference signal.

In another possible implementation, the receiving unit 801 is further configured to receive an LPP message of the terminal forwarded by the access network device that the terminal camps on.

Specifically, each step related to the first network element in the foregoing method embodiments may be related to a corresponding functional unit or module in the apparatus. The communication apparatus may be configured to perform the function of the first network element in the foregoing positioning measurement method. Therefore, effect the same as that of the foregoing positioning measurement method can be achieved. Details are not described herein again.

Figure 9:
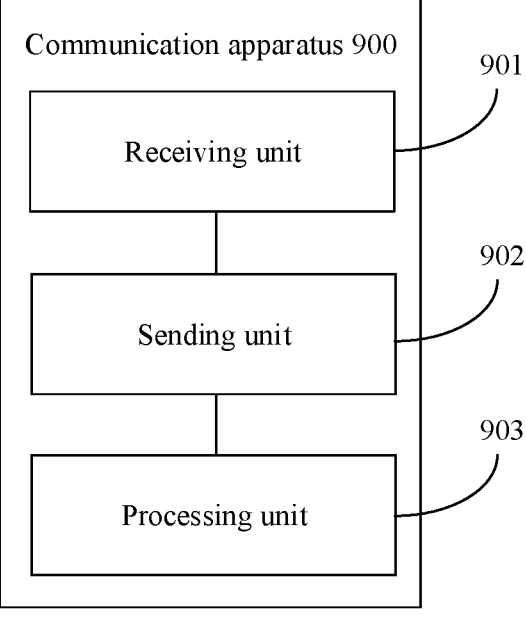
FIG. 9 is a schematic diagram of composition of still another communication apparatus according to an embodiment of this application.

FIG. 9 is a diagram of a structure of a communication apparatus 900. The communication apparatus 900 may be an access network device, a chip or a system-on-chip in the access network device, another apparatus that may implement the function of the access network device in the foregoing method, or the like. The communication apparatus 900 may be configured to perform the function of the access network device in the foregoing method embodiments. In a possible implementation, the communication apparatus 900 shown in FIG. 9 includes a receiving unit 901, a sending unit 902, and a processing unit 903.

The receiving unit 901 may be configured to receive a broadcast request and a measurement request from a first network element, where the measurement request indicates to measure a reference signal.

The sending unit 902 may be configured to broadcast a second message based on the broadcast request, where the second message indicates a terminal to send the reference signal.

The processing unit 903 may be configured to measure the reference signal sent by the terminal, to obtain a measurement result.

In a possible implementation, the receiving unit 901 is specifically configured to receive a third message from the first network element, where the third message includes the broadcast request and the measurement request.

In another possible implementation, the measurement request includes a measurement item, and the measurement item indicates a target parameter for measuring the reference signal. The processing unit 903 is specifically configured to measure the measurement item of the reference signal, to obtain the measurement result.

In another possible implementation, the second message includes configuration information of a plurality of SRS resources, and the plurality of SRS resources are used by the terminal to send the reference signal.

In another possible implementation, the processing unit 903 is further configured to search the plurality of SRS resources, to measure the reference signal of the terminal on one of the plurality of SRS resources.

In another possible implementation, the receiving unit 901 is further configured to receive, from the terminal, an SRS resource identifier of a first SRS resource, where the first SRS resource is used by the terminal to send the reference signal. The processing unit 903 is specifically configured to measure the reference signal of the terminal on the first SRS resource based on the SRS resource identifier of the first SRS resource.

In another possible implementation, the sending unit 902 is further configured to send a measurement result to the first network element, where the measurement result includes a timestamp and/or the SRS resource identifier of the SRS resource on which the reference signal of the terminal is measured. The timestamp indicates time at which the access network device measures the reference signal.

In another possible implementation, the access network device is an access network device that the terminal camps on. The receiving unit 901 is further configured to receive a fourth message from the terminal, where the fourth message includes an identifier of the terminal.

In another possible implementation, the fourth message is an RRC message or a MAC message.

In another possible implementation, the fourth message further includes an LPP message. The sending unit 902 is further configured to send the LPP message to the first network element.

Specifically, each step related to the access network device in the foregoing method embodiments may be related to a corresponding functional unit or module in the apparatus. The communication apparatus may be configured to perform the function of the access network device in the foregoing positioning measurement method. Therefore, effect the same as that of the foregoing positioning measurement method can be achieved. Details are not described herein again.

Figure 10:
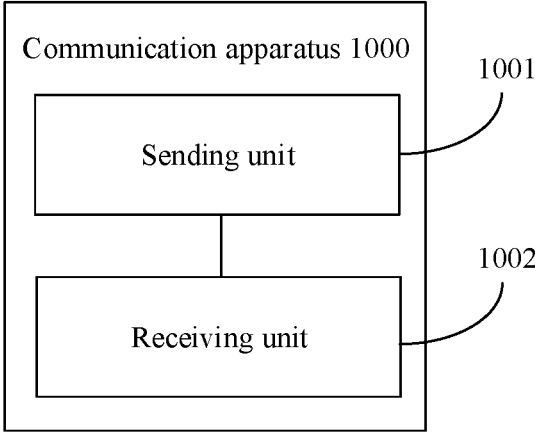
FIG. 10 is a schematic diagram of composition of yet another communication apparatus according to an embodiment of this application.

FIG. 10 is a diagram of a structure of a communication apparatus 1000. The communication apparatus 1000 may be a second network element, a chip or a system-on-chip in the second network element, another apparatus that may implement the function of the second network element in the foregoing methods, or the like. The communication apparatus 1000 may be configured to perform the function of the second network element in the foregoing method embodiments. In a possible implementation, the communication apparatus 1000 shown in FIG. 10 includes a sending unit 1001, a receiving unit 1002, and the like.

The sending unit 1001 may be configured to send a first message to a first network element, where the first message indicates the first network element to obtain location information of a terminal, and the first message includes an identifier of an access network device that the terminal camps on and/or an identifier of a cell in which the access network device that the terminal camps on is located.

In a possible implementation, the receiving unit 1002 may be configured to receive an NGAP message from the access network device, where the NGAP message includes an LPP message. The sending unit 1001 is further configured to send the LPP message to the first network element.

Specifically, each step related to the second network element in the foregoing method embodiments may be related to a corresponding functional unit or module in the apparatus. The communication apparatus may be configured to perform the function of the second network element in the foregoing positioning measurement method. Therefore, effect the same as that of the foregoing positioning measurement method can be achieved. Details are not described herein again.

Figure 11:
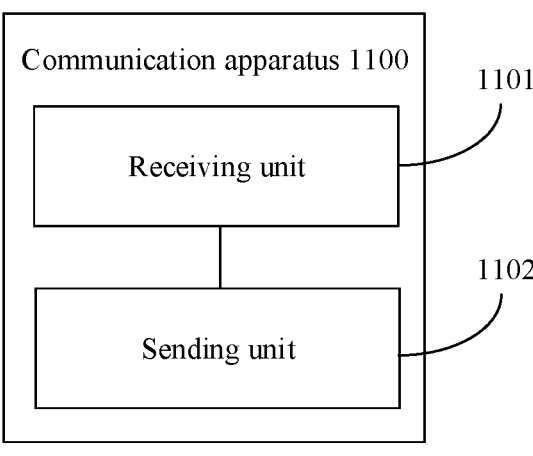
FIG. 11 is a schematic diagram of composition of still yet another communication apparatus according to an embodiment of this application.

FIG. 11 is a diagram of a structure of a communication apparatus 1100. The communication apparatus 1100 may be a terminal, a chip or a system-on-chip in the terminal, another apparatus that may implement the function of the terminal in the foregoing methods, or the like. The communication apparatus 1100 may be configured to perform the function of the terminal in the foregoing method embodiments. In a possible implementation, the communication apparatus 1100 shown in FIG. 11 includes a receiving unit 1101, a sending unit 1102, and the like.

The receiving unit 1101 may be configured to receive a second message broadcast by an access network device, where the second message indicates a terminal to send a reference signal. The sending unit 1102 may be configured to send the reference signal.

In a possible implementation, the second message includes configuration information of a plurality of SRS resources. The sending unit 1102 is specifically configured to select a first SRS resource from the plurality of SRS resources based on the configuration information of the plurality of SRS resources, and send the reference signal.

In another possible implementation, the sending unit 1102 is further configured to send an SRS resource identifier of the first SRS resource to the access network device.

In another possible implementation, the access network device is an access network device that the terminal camps on. The sending unit 1102 is further configured to send a fourth message to the access network device, where the fourth message includes an identifier of the terminal.

In another possible implementation, the fourth message is an RRC message or a MAC message.

In another possible implementation, the fourth message further includes an LPP message.

Specifically, each step related to the terminal in the foregoing method embodiments may be related to a corresponding functional unit or module in the apparatus. The communication apparatus may be configured to perform the function of the terminal in the foregoing positioning measurement method. Therefore, effect the same as that of the foregoing positioning measurement method can be achieved. Details are not described herein again.

An embodiment of this application further provides a communication system. The communication system may include a terminal, a first network element, a second network element, and an access network device. The first network element may have functions of the foregoing communication apparatus 800, the access network device may have functions of the foregoing communication apparatus 900, the second network element may have functions of the foregoing communication apparatus 1000, and the terminal may have functions of the foregoing communication apparatus 1100.

An embodiment of this application further provides a computer-readable storage medium. All or some of the processes in the foregoing method embodiments may be implemented by a computer program instructing related hardware. The program may be stored in the computer-readable storage medium. When the program is executed, the processes of the foregoing method embodiments may be performed. The computer-readable storage medium may be an internal storage unit of the apparatus including, for example, a data transmitting end and/or a data receiving end, according to any one of the foregoing embodiments, for example, a hard disk or a memory of the apparatus. Alternatively, the computer-readable storage medium may be an external storage device of the foregoing apparatus, for example, a plug-in hard disk, a smart media card (SMC), a secure digital (SD) card, a flash card, or the like that is configured on the apparatus. Further, the foregoing computer-readable storage medium may alternatively include both the internal storage unit and the external storage device of the foregoing apparatus. The computer-readable storage medium is configured to store the foregoing computer program and other programs and data that are required by the foregoing apparatus. The computer-readable storage medium may be further configured to temporarily store data that has been output or is to be output.

An embodiment of this application further provides computer instructions. All or some of the procedures in the foregoing method embodiments may be implemented by the computer instructions instructing related hardware (such as a computer, a processor, a network device, and a terminal). A program may be stored in the foregoing computer-readable storage medium.

An embodiment of this application further provides a chip system. The chip system may include a chip, or may include a chip and another discrete component. This is not limited herein. The chip system includes a processor and a transceiver. All or some procedures in the foregoing method embodiments may be completed by the chip system. For example, the chip system may be configured to: implement the function performed by the terminal device in the foregoing method embodiments, implement the function performed by the first network element or the second network element in the foregoing method embodiments, or implement the function performed by the access network device in the foregoing method embodiments.

In a possible design, the chip system further includes a memory. The memory is configured to store program instructions and/or data. When the chip system is run, the processor executes the program instructions stored in the memory, so that the chip system performs the function performed by the terminal in the foregoing method embodiments, performs the function performed by the access network device in the foregoing method embodiments, or performs the function performed by the first network element or the second network element in the foregoing method embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, such as a hard disk drive (HDD) or a solid-state drive (SSD), or may be a volatile memory, such as a random access memory (RAM). The memory is any other medium that can be configured to carry or store expected program code in a form of an instruction structure or a data structure and that can be accessed by a computer, but is not limited thereto. The memory in this embodiment of this application may alternatively be a circuit or any other apparatus that can implement a storage function, and is configured to store instructions and/or data.

It should be noted that the terms "including", "having", or any other variant thereof mentioned in the specification, claims, and the accompanying drawings of this application, are intended to cover a non-exclusive inclusion. For example, a process, a method, a system, a product, or a device including a series of steps or units is not limited to the listed steps or units, but optionally further includes another unlisted step or unit, or optionally further includes another inherent step or unit of the process, the method, the product, or the device.

The foregoing descriptions about implementations allow persons skilled in the art to understand that, for the purpose of convenient and brief description, division of the foregoing functional modules is used as an example for description. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division, and there may be another division manner in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit. When the integrated unit is implemented in the form of a software functional unit and sold or used as an independent product, the integrated unit may be stored in a readable storage medium. Based on such an understanding, the technical solutions of embodiments of this application essentially, or the part contributing to the existing technology, or all or some of the technical solutions may be implemented in a form of a software product. The software product is stored in a storage medium and includes several instructions for instructing a device, where for example, the device may be a single-chip microcomputer or a chip, or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A positioning measurement method, wherein the method comprises:

receiving, by a first network element, a first message from a second network element, wherein the first message indicates the first network element to obtain location information of a terminal; and sending, by the first network element, a broadcast request and a measurement request to at least one access network device, wherein the broadcast request indicates to broadcast a second message, the measurement request indicates to measure a reference signal, the second message indicates the terminal to send the reference signal, and the at least one access network device comprises an access network device that the terminal camps on; and receiving, by the first network element, a measurement result from the at least one access network device, wherein the measurement result comprises a timestamp and/or a sounding reference signal (SRS) resource identifier of a first SRS resource that are/is used by the first network element to determine that the measurement result is obtained by measuring the terminal.

2. The method according to claim 1, wherein sending the broadcast request and the measurement request to the at least one access network device comprises:

sending, by the first network element, a third message to the at least one access network device, wherein the third message comprises the broadcast request and the measurement request.

3. The method according to claim 1, wherein the measurement request comprises a measurement item, and the measurement item indicates a target parameter for measuring the reference signal.

4. The method according to claim 1, wherein the first message comprises an identifier of the access network device that the terminal camps on and/or an identifier of a cell in which the access network device that the terminal camps on is located.

5. The method according to claim 1, wherein the method further comprises:

determining, by the first network element, location information of the terminal based on the measurement result.

6. The method according to claim 5, wherein the method further comprises:

receiving, by the first network element, an identifier of the terminal from the access network device that the terminal camps on, wherein the identifier of the terminal is from the terminal.

7. The method according to claim 5, wherein the timestamp indicates a time at which the at least one access network device measures the reference signal, and the first SRS resource is used by the terminal to send the reference signal.

8. The method according to claim 1, wherein the method further comprises:

receiving, by the first network element, a long term evolution positioning protocol (LPP) message of the terminal forwarded by the access network device that the terminal camps on.

9. A positioning measurement method, wherein the method comprises:

receiving, by an access network device, a broadcast request and a measurement request from a first network element, wherein the measurement request indicates to measure a reference signal;

broadcasting, by the access network device, a second message based on the broadcast request, wherein the second message indicates a terminal to send the reference signal; and measuring, by the access network device, the reference signal sent by the terminal, to obtain a measurement result, wherein the measurement result comprises a timestamp and/or a sounding reference signal (SRS) resource identifier of a first SRS resource that are/is used by the first network element to determine that the measurement result is obtained by measuring the terminal.

10. The method according to claim 9, wherein receiving the broadcast request and the measurement request from the first network element comprises:

receiving, by the access network device, a third message from the first network element, wherein the third message comprises the broadcast request and the measurement request.

11. The method according to claim 9, wherein the measurement request comprises a measurement item, and the measurement item indicates a target parameter for measuring the reference signal; and wherein measuring the reference signal sent by the terminal, to obtain the measurement result comprises:

measuring, by the access network device, the measurement item of the reference signal, to obtain the measurement result.

12. The method according to claim 9, wherein the second message comprises configuration information of a plurality of SRS resources, and the plurality of SRS resources are used by the terminal to send the reference signal.

13. The method according to claim 12, wherein the method further comprises:

searching, by the access network device, the plurality of SRS resources, to measure the reference signal of the terminal on one of the plurality of SRS resources.

14. The method according to claim 12, wherein the method further comprises:

receiving, from the terminal by the access network device, an SRS resource identifier of a first SRS resource, wherein the first SRS resource is used by the terminal to send the reference signal; and measuring, by the access network device, the reference signal of the terminal on the first SRS resource based on the SRS resource identifier of the first SRS resource.

15. A positioning measurement method, wherein the method comprises:

receiving, by a terminal, a message broadcast by an access network device, wherein the message indicates the terminal to send a reference signal; and sending, by the terminal, the reference signal, to the access network device for measurement to obtain a measurement result, wherein the measurement result comprises a timestamp and/or a sounding reference signal (SRS) resource identifier of a first SRS resource that are/is used by a first network element to determine that the measurement result is obtained by measuring the terminal.

16. The method according to claim 15, wherein the message comprises configuration information of a plurality of SRS resources; and wherein sending the reference signal comprises:

selecting, by the terminal, the first SRS resource from the plurality of SRS resources based on the configuration information of the plurality of SRS resources, and sending the reference signal.

17. The method according to claim 16, wherein the method further comprises:

sending, by the terminal, the SRS resource identifier of the first SRS resource to the access network device.

18. The method according to claim 15, wherein the access network device is an access network device that the terminal camps on, and the method further comprises:

sending, by the terminal, another message to the access network device, wherein the another message comprises an identifier of the terminal.

19. The method according to claim 18, wherein the another message is a radio resource control (RRC) message or a media access control (MAC) message.

20. The method according to claim 18, wherein the another message further comprises a long term evolution positioning protocol (LPP) message.

* * * * *